(12) United States Patent
Kundu et al.

(10) Patent No.: US 11,184,402 B2
(45) Date of Patent: Nov. 23, 2021

(54) RESOURCE ACCESS POLICY ENFORCEMENT USING A HYPERGRAPH

(71) Applicant: International Business Machines Corporation, Armonk, NY (US)

(72) Inventors: Ashish Kundu, Elmsford, NY (US); Joshua Payne, San Antonio, TX (US); Arjun Natarajan, Old Tappan, NJ (US); Roger C. Raphael, San Jose, CA (US); Scott Schumacher, Porter Ranch, CA (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 16/830,019

(22) Filed: Mar. 25, 2020

(65) Prior Publication Data

US 2021/0306377 A1 Sep. 30, 2021

(51) Int. Cl.
| | |
|---|---|
| *G06F 15/16* | (2006.01) |
| *H04L 29/06* | (2006.01) |
| *G06N 3/04* | (2006.01) |
| *H04L 12/24* | (2006.01) |
| *G06K 9/62* | (2006.01) |
| *H04L 12/911* | (2013.01) |

(52) U.S. Cl.
CPC ............ *H04L 63/20* (2013.01); *G06K 9/6256* (2013.01); *G06N 3/04* (2013.01); *H04L 41/22* (2013.01); *H04L 47/781* (2013.01); *H04L 63/102* (2013.01)

(58) Field of Classification Search
CPC ....... H04L 83/20; H04L 41/22; H04L 47/281; H04L 63/102; G06Q 9/6526; G06N 3/04

USPC ................ 709/203, 220, 224, 226, 228, 232
See application file for complete search history.

(56) References Cited

U.S. PATENT DOCUMENTS

| 8,887,286 B2 | 11/2014 | Dupont et al. |
| 8,949,931 B2* | 2/2015 | Ermagan ................. G06F 21/54 |
| | | 726/1 |
| 10,178,131 B2* | 1/2019 | Nedeltchev ............ G06N 5/022 |
| 10,349,134 B2 | 7/2019 | Hamiti et al. |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Khanh Q Dinh
(74) *Attorney, Agent, or Firm* — Law Office of Jim Boice

(57) ABSTRACT

A method trains a neural network to recognize whether a resource is authorized to be returned to a requester. One or more processors train a neural network to traverse a policy enforcement hypergraph in order to identify a security policy to be used for a resource request and to authorize a use of a requested resource by a requester. The policy enforcement hypergraph is derived from a policy enforcement graph that expresses a set of security profiles for resources and requesters. The processor(s) receive a resource request for a requested resource from a requester, where the resource request includes a description of the requester. A system/user inputs a description of the received resource request and a description of the policy enforcement hypergraph into the trained neural network in order to selectively return the requested resource to the requester.

20 Claims, 7 Drawing Sheets

(56) References Cited

U.S. PATENT DOCUMENTS

| | | | | |
|---|---|---|---|---|
| 10,431,556 | B2* | 10/2019 | Usami | H01L 23/49816 |
| 10,496,369 | B2* | 12/2019 | Guttmann | G06N 5/022 |
| 10,567,384 | B2* | 2/2020 | Kang | H04L 41/0893 |
| 10,725,735 | B2* | 7/2020 | Guttmann | G06N 5/04 |
| 10,839,084 | B2* | 11/2020 | Peled | G06F 3/147 |
| 2014/0250489 | A1* | 9/2014 | Calo | H04L 63/20 726/1 |
| 2015/0347480 | A1 | 12/2015 | Smart et al. | |
| 2018/0365556 | A1* | 12/2018 | Guttmann | G06F 21/6218 |
| 2019/0188389 | A1* | 6/2019 | Peled | H04L 63/20 |
| 2020/0014274 | A1* | 1/2020 | Petitgas | H02K 15/0018 |

OTHER PUBLICATIONS

IBM Watson Knowledge Catalog (WKC). https://dataplatform.cloud.ibm.com/docs/content/wsj/catalog/overview-wkc.html.

James A. Hoagland et al., "A Graph-based Language for Specifying Security Policies". https://pdfs.semanticscholar.org/7fc4/3f49abf2071af5daecd23a7f68884a8c41e2.pdf.

Lu'ay Wahsheh and Jim Alves-Foss, "Using Policy Enforcement Graphs in a Separation-Based High Assurance Architecture", https://ieeexplore.ieee.org/document/4296618.

Cynthia Dwork and Aaron Roth, "Algorithmic Foundations of Differential Privacy", https://www.cis.upenn.edu/~aaroth/Papers/privacybook.pdf.

Abdullah Al-Shomrani et al., "Policy enforcement for big data security". https://ieeexplore.ieee.org/document/7905266 Graph Data Analysis.

Franco Scarselli et al,, "The Graph Neural Network Model", University of Wollongong, 2009.

Michael Defferrard et al, Convolutional Neural Networks on Graphs with Fast Localized Spectral Filtering—http://papers.nips.cc/paper/6081-convolutional-neural-networks-on-graphs-with-fast-localized-spectral-filtering.pdf.

Bryan Perozzi et al, DeepWalk: Online Learning of Social Representations—https://arxiv.org/pdf/1403.6652.pdf.

Aditya Grover and Jure Leskovec, node2vec: Scalable Feature Learning for Networks—https://arxiv.org/pdf/1607.00653.pdf.

William Hamilton et al, Inductive Representation Learning on Large Graphs (GraphSAGE): https://arxiv.org/pdf/1706.02216.pdf.

Borislav Iordanov, "HyperGraphDB: A Generalized Graph Database". http://www.hypergraphdb.org/docs/hypergraphdb.pdf.

Linas Vepstas, "Why Hypergraphs?" https://blog.opencog.org/2013/03/24/why-hypergraphs/.

Dengyong Zhou et al, Learning with Hypergraphs: Clustering, Classification, and Embedding—http://papers.nips.cc/paper/3128-learning-with-hypergraphs-clustering-classification-and-embedding.pdf.

Dimitrios Gunopulos et al, Data mining, Hypergraph Transversals, and Machine Learning—http://delivery.acm.org/10.1145/270000/263684/p209-gunopulos.pdf.

Yifan Feng, Haoxuan You, Zizhao Zhang, Rongrong Ji, Yue Gao, "Hypergraph Neural Networks". http://gaoyue.org/paper/HGNN.pdf.

Uthsav Chitra, Benjamin J Raphael, "Random Walks on Hypergraphs with Edge-Dependent Vertex Weights". https://arxiv.org/pdf/1905.08287.pdf.

Uthsav Chitra. Random Walks on Hypergraphs with Applications to Disease-Gene Prioritization—http://cs.brown.edu/research/pubs/theses/ugrad/2017/chitra.uthsav.pdf.

Gonzales-Granadillo, G, et al.; "Hypergraph-Driven Mitigation of Cyberattacks", https://onlinelibrary.wiley.com/doi/full/10.1002/itl2.38.

Fatemi, B. et al.; "Knowledge Hypergraphs: Prediction Beyond Binary Relations", 2019.

"GRC Platform Considerations", Protivity.

IBM, "System and Method of Enhanced Rules-Based Policy Hierarchy Governances and Enforcement in a Virtual World", Sep. 18, 2008.

Sharp, Austin et al., "JanusGraph", https://www.janusgraph.org, Mar. 2020.

* cited by examiner

RESOURCE ACCESS POLICY ENFORCEMENT USING A HYPERGRAPH

BACKGROUND

The present invention relates to the field of hypergraphs. Still more particularly, the present invention relates to the field of utilizing a hypergraph to govern security enforcement for policies for resource requests.

A hypergraph is a data structure with data points ("nodes", also called vertices) and collections that contain certain data points ("hyperedges", also called hyperlinks). Within the hypergraph, nodes are part of the same collection if they are within the same hyperedge.

Policies for governing access to resources, including but not limited to data, are complex and require an expressive and adaptive method of representation. For example, certain types of data are subject to different policies, such as which entities (systems and/or users) can access them, where they are to be stored, what types of data can be stored in a same storage device and/or area of memory, etc.

The relationships between data, separate policies, and entities becomes computationally difficult when trying to analyze relationships between different objects via non-graphical representation. For example, if rules for which entities can access data, where the data can be stored, how the data can be stored, etc. are in a table or text document, then recognition and/or enforcement of these rules becomes practically impossible, particularly where the data is extremely large, stored in a variety of locations (e.g., on a "cloud" of storage devices), etc.

SUMMARY

In one or more embodiments of the present invention, a method trains a neural network to recognize whether a resource is authorized to be returned to a requester. One or more processors construct a policy enforcement graph to express a set of security policies for resources and requesters. The processor(s) construct a policy enforcement hypergraph to express the set of security policies, where the policy enforcement hypergraph is derived from the policy enforcement graph, and where a hypergraph is a generalization of a graph in which an edge can join any number of vertices. The processor(s) train a neural network to traverse the policy enforcement hypergraph in order to identify a security policy to be used for the resource request and to authorize use of the requested resource by the requester. The processor(s) receive a resource request for a requested resource from a requester, where the resource request includes a description of the requester. A system/user inputs a description of the received resource request and a description of the policy enforcement hypergraph into the trained neural network, and responds to the resource request by selectively returning the requested resource to the requester based on whether the requested resource is authorized by the trained neural network to be returned to the requester.

In one or more embodiments, the method(s) described herein are performed by an execution of a computer program product and/or a computer system.

DETAILED DESCRIPTION

Figure 1:
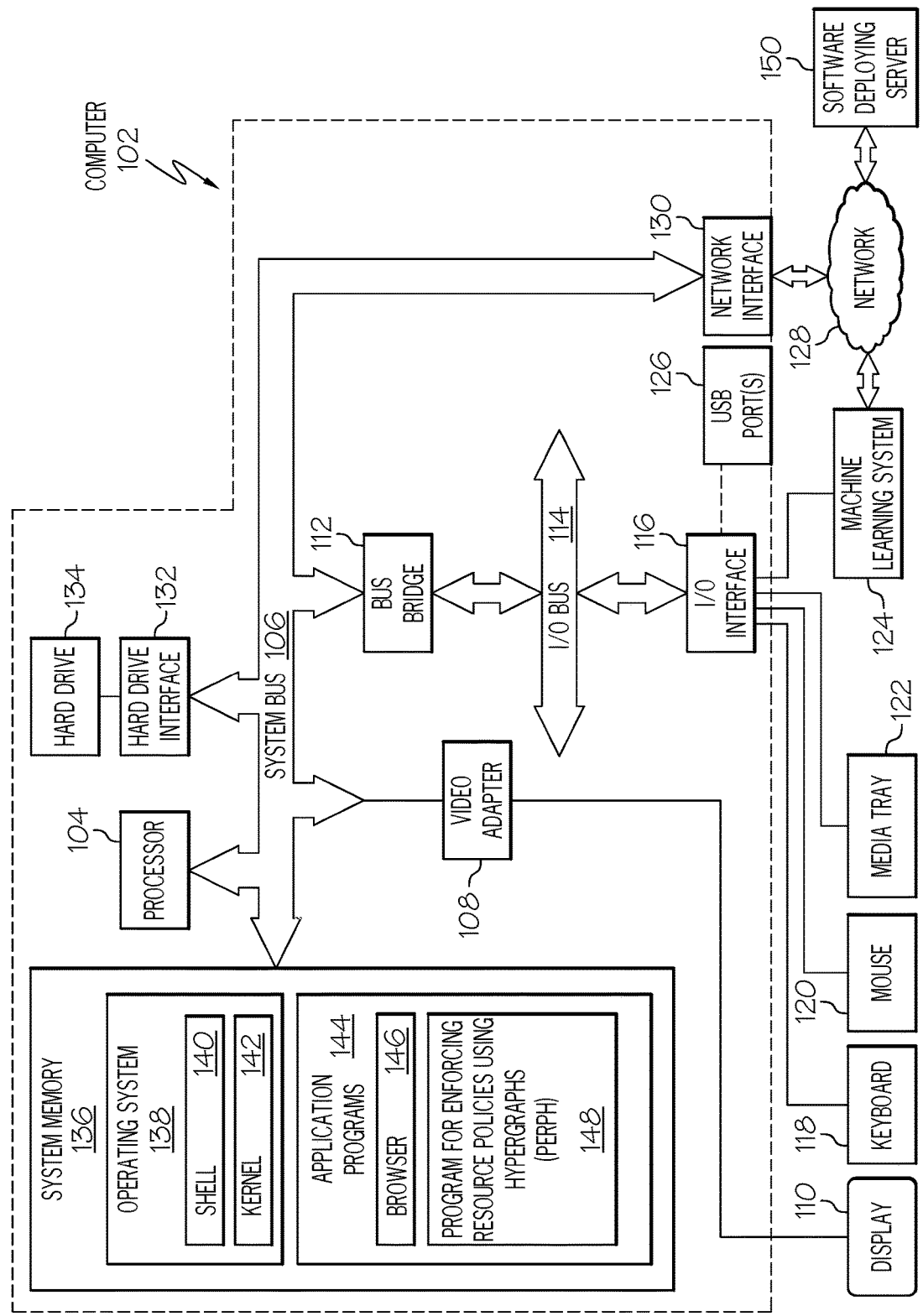
FIG. 1 depicts an exemplary system and network in which the present invention is implemented in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that is utilized by and/or implemented in one or more embodiments of the present invention. Note that some or all of the exemplary architecture, including both depicted hardware and software, shown for and within computer 102 may be utilized by machine learning system 124 and/or software deploying server 150 shown in FIG. 1, as well as the deep neural network (DNN) 424 shown in FIG. 4.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a machine learning system 124, and external USB port(s) 126. While the format of the ports connected to I/O interface 116 may be any known to those skilled in the art of computer architecture, in one or more embodiments some or all of these ports are universal serial bus (USB) ports.

As depicted, computer 102 is able to communicate with a software deploying server 150 and/or the machine learning system 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one or more embodiments, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system.

More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Program for Enforcing Resource Policies using Hypergraphs (PERPH) 148. PERPH 148 includes code for implementing the processes described below, including those described in FIGS. 2-5. In one or more embodiments, computer 102 is able to download PERPH 148 from software deploying server 150, including in an on-demand basis, wherein the code in PERPH 148 is not downloaded until needed for execution. Note further that, in one or more embodiments of the present invention, software deploying server 150 performs all of the functions associated with the present invention (including execution of PERPH 148), thus freeing computer 102 from having to use its own internal computing resources to execute PERPH 148.

Also connected to (or alternatively, as part of) computer 102 is a machine learning system 124. In exemplary embodiments of the present invention, machine learning system 124 is a Deep Neural Network (see FIG. 4) or another type of heuristic artificial intelligence.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention. For example, and with specific regard to a server as used in one or more embodiments of the present invention, computer 102 is lacking elements such as irrelevant components such as video adapter 108, keyboard 118, etc., but includes elements (not shown) such as graphics processing units, co-processors for various functions (e.g., dedicated to certain arithmetic processes), etc.

As described herein, one or more embodiments of the present invention utilize hypergraphs in order to know which distributions between combinations of assets to compute (e.g., describe how data can be shared, stored, etc.). The hypergraphs described herein also associate action flows as object pathways for requests, association of rules/data, similarity of rules/data, decision of which policy/rule to apply, application of the appropriate policy/rule, and to respond to a data request. That is, and as described herein, one or more embodiments of the present invention group together users, assets, and policies in a way that captures relationships which are expressed in hyperedge(s) in hypergraph(s).

Figure 2:
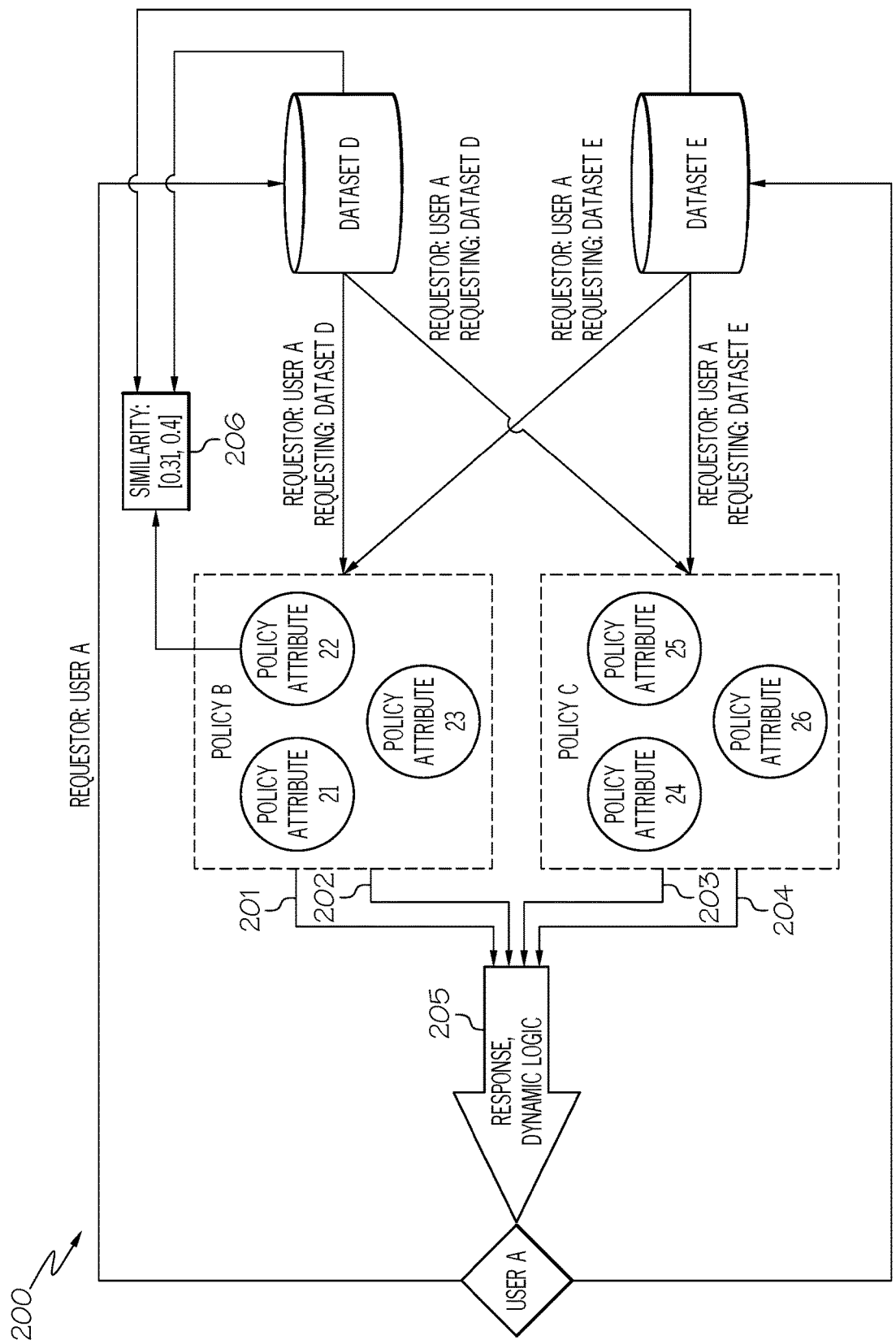
FIG. 2 illustrates an exemplary policy enforcement graph for enforcing data policies as used in one or more embodiments of the present invention.

With reference now to FIG. 2, an exemplary policy enforcement graph 200 used in one or more embodiments of the present invention to create an enforcement hypergraph is presented.

Policy enforcement graph 200 is a graph that is used to enforce data policies.

Vertices types shown in policy enforcement graph 200 include: Users/requestors (e.g., User A); assets (e.g., datasets, databases, hardware), such as dataset D and dataset E; policies (e.g., policy B and policy C, which respectively have policy attributes 21-23 and policy attributes 24-26, which describe what types of systems and/or users are authorized to utilize resources such as dataset D and/or dataset E, governance entities, abstract data types, policies on where data can be stored, policies on where data of a certain type are allowed to be stored, etc.

Edge types between vertices depend on a source vertex (e.g., User A) and a target vertex (e.g., dataset D). Exemplary edges (depicted as arrows in FIG. 2) within policy enforcement graph 200 include a request for an asset, as described by the edge/arrow from User A and dataset D and/or dataset E). That is, an edge can demonstrate an action.

Other edges within the policy enforcement graph 200 represent an evaluation of an asset (e.g., dataset D) with respect to a policy describing which user the policy applies to, whether that user is allowed to use that asset, etc. That is, these edges describe how assets are to be used for certain entities (systems and/or users).

Other edges describe information needed in a response (using dynamic logic) to User A, as depicted as response 205.

For example, edge 201 includes the following information for resource requestor User A: Requested resource: Dataset D; Policy Attributes: policy attribute 21, policy attribute 23.

Edge 202 includes the following information for resource requestor User A: Requested resource: Dataset D; Policy Attributes: policy attribute 22.

Edge 203 includes the following information for resource requestor User A: Requested resource: Dataset D; Policy Attributes: policy attribute 25, policy attribute 26.

Edge 204 includes the following information for resource requestor User A: Requested resource: Dataset E; Policy Attributes: policy attribute 24, policy attribute 25. policy attribute 26.

Thus, edges 201-204 describe policy information about dataset D and/or dataset E that relate to User A.

As such, edges such as edges 201-204 describe which user is allowed to access and/or transform a particular asset (resource); which asset is being requested by a particular user; which policy(s) apply to a particular user and/or asset; and which rules (i.e., part of a policy) apply to a particular asset.

Similarity vector 206 describes how well certain resources comport with particular policy attributes. For example, similarity vector 206 shows that dataset D has a 31% (0.31) conformance with policy attribute 22, and that dataset E has a 40% (0.40) conformance with policy attribute 22. As such, dataset E is better suited (based on policy B) to respond to User A's response for data.

While policy enforcement graph 200 provides information needed to determine whether a particular asset is available to User A based on relevant policies, the information is difficult, if practically impossible, to utilize when deciding whether to allow User A to access dataset D or dataset E. That is, the information shown in FIG. 2 is essentially tabular, and thus it is difficult to understand how different datasets interact with different policies and their attributes, and whether or not particular users are allowed to access these different datasets based on the different policies and their attributes.

Figure 3:
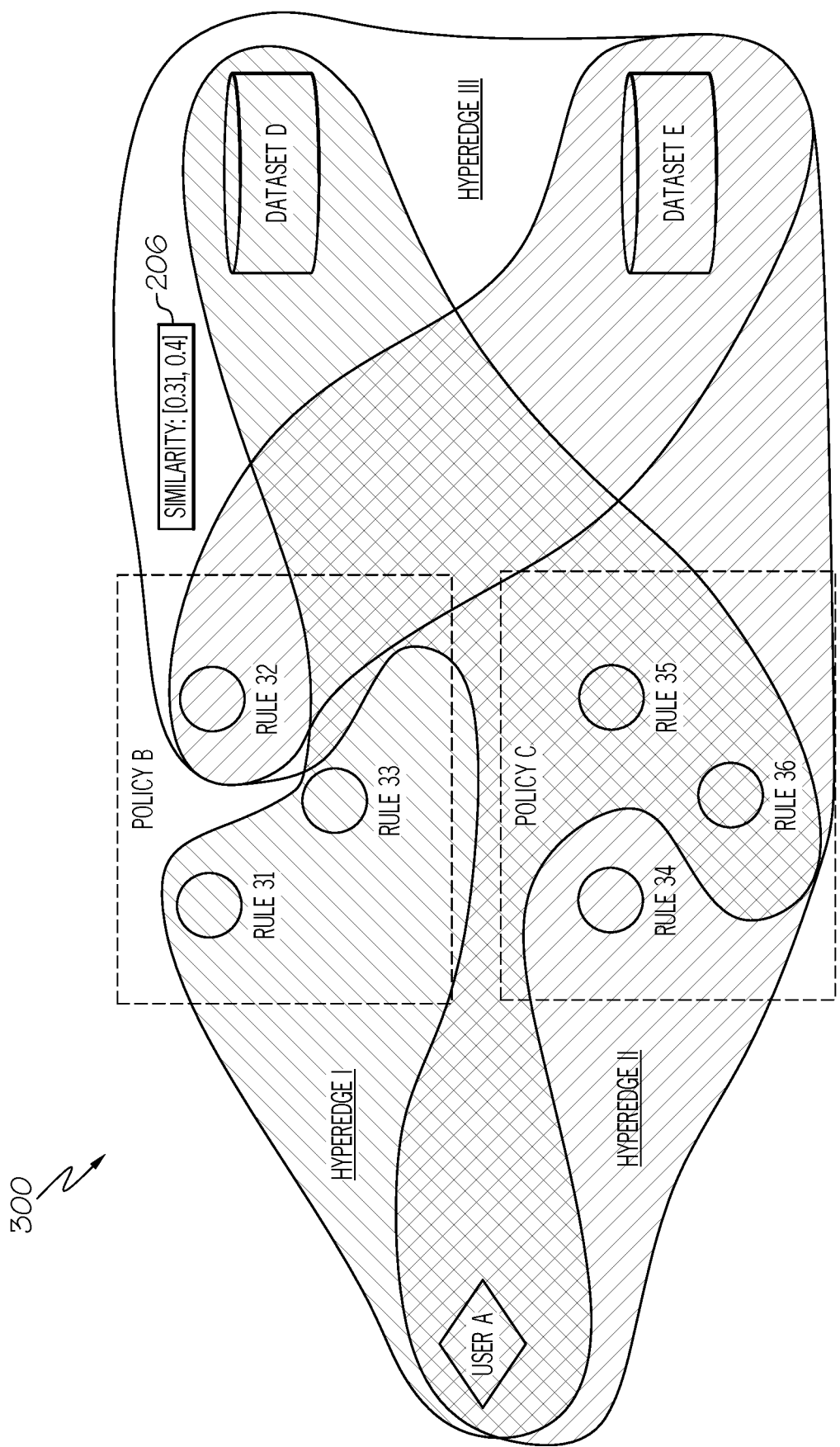
FIG. 3 depicts an exemplary policy enforcement hypergraph for enforcing data policies as used in one or more embodiments of the present invention.

As such, one or more embodiments of the present invention generate a policy enforcement hypergraph, such as the policy enforcement hypergraph 300 shown in FIG. 3, which is derived from the policy enforcement graph 200 shown in FIG. 2.

As shown in FIG. 3, policy enforcement hypergraph 300 includes the User A, policy B, policy C, dataset D, dataset E, and similarity vector 206 found in policy enforcement graph 200 shown in FIG. 2. Furthermore, policy enforcement hypergraph 300 includes rule 31, rule 32, rule 33, rule 34, rule 35, and rule 36, which respectively are components of the policy attribute 21, policy attribute 22, policy attribute 23, policy attribute 24, policy attribute 25, and policy attribute 26 shown in FIG. 2. That is, a policy describes various features of a particular asset/resource, or which a rule is one of such features. In addition, however, the policy enforcement hypergraph 300 includes hyperedges I-III, which provide a new ability for enforcing policies regarding access to certain resources, such as datasets.

Therefore, and as described herein, policy enforcement hypergraph 300 provides a new and useful improvement over the policy enforcement graph 200 when evaluating resources due to the power of hyperedge I, hyperedge II, and hyperedge III when traversing through policy enforcement hypergraph 300 to identify policies for certain resources (e.g., dataset D) as applied to certain users/systems (e.g., User A).

That is, rather than walking/traversing through the various vertices and edges shown in policy enforcement graph 200, which requires heavy processing resources to interpret the vertices and edges for the policies that they represent when User A attempts to access certain resources, walking/traversing through hyperedges (e.g., hyperedge I, hyperedge II, and/or hyperedge III) in the policy enforcement hypergraph 300 allows the system to quickly and efficiently evaluate policies related to the User A who is trying to access these resources.

More specifically, traversing through hyperedges in the policy enforcement hypergraph 300 enables the system to quickly apply certain policy rules to certain resources for certain users.

For example, in FIG. 3, assume that hyperedge I is defined for User A, policy rule 31, policy rule 33, policy rule 35, policy rule 36, and dataset D.

Assume further that hyperedge II is defined for User A, policy rule 32, policy C, and dataset E.

Assume further that hyperedge III is defined for dataset D, dataset E, policy rule 32, and similarity vector 206 ([0.31, 0.4]).

As such, if a system (e.g., Deep Neural Network—DNN 424 described below in FIG. 4) is trained to identify policies to be used for User A, it will quickly recognize hyperedge I and hyperedge II are being relevant. More specifically, if User A is requesting data from dataset D, then hyperedge I is the only relevant hyperedge, since it is the only hyperedge relevant to User A and dataset D.

As such, policy enforcement hypergraph 300 enables the system to conduct a graph traversal-based, path-based policy enforcement that uses similarity measurements between entities (e.g., users), policies, and assets (e.g., resources such as the datasets shown in FIG. 3) by traversing through a particular hyperedge within the policy enforcement hypergraph 300, and enables a policy application analysis (suggesting change of scope, addition/deletion of policies). Thus, one or more embodiments of the present invention extend a policy enforcement graph (e.g., a data policy enforcement graph) to be represented as a data policy enforcement hypergraph, which is a combinatorial object that is more general and expressive than a simple graph, by using hyperedges that express the applications of policies to particular resources and for particular requesters, and provides a hierarchical expression of policies as hypervertices (induced sub-hypergraphs) that allows for efficient knowledge representation. Such hypervertices are easily modified and vertices within hyperedges become collapsible/morphable prior to queries according to policy enforcement graph protocol.

In an embodiment of the present invention, the traversal through the policy enforcement hypergraph 300 and the decisions that are developed therefrom are performed in a rule-based manner. That is, rules define which pathways are to be taken through policy enforcement hypergraph 300 according to what resources are being requested, a profile of the requesting entity, etc. These rules are then used to guide a user and/or train a neural network to determine whether or not to authorize a requester access to a requested resource, as described herein.

Figure 4:
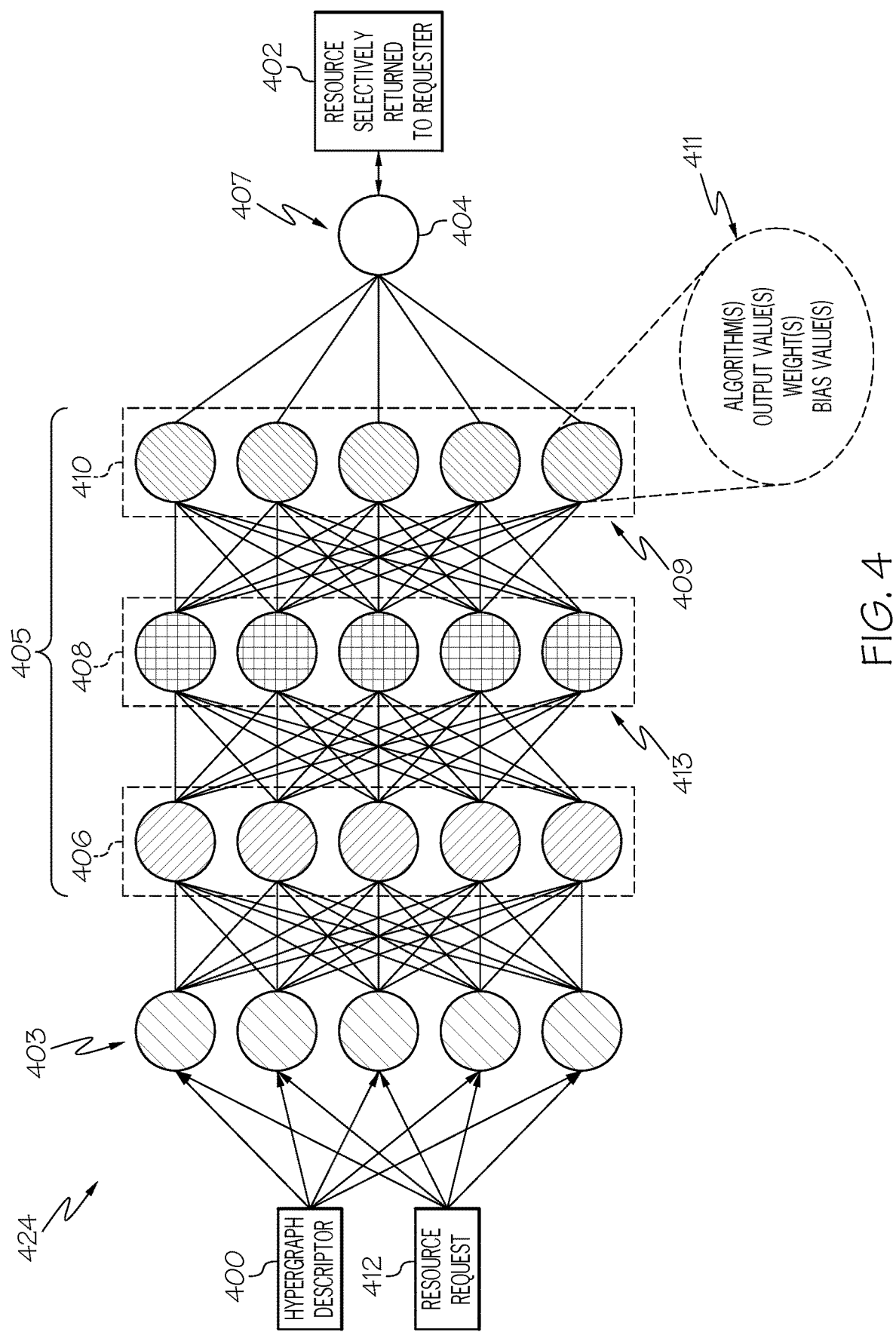
FIG. 4 illustrates an exemplary Deep Neural Network (DNN) as used in one or more embodiments of the present invention.

With reference then to FIG. 4, an exemplary deep neural network (DNN) 424 as utilized in one or more embodiments of the present invention is presented. The nodes within DNN 424 represent hardware processors, virtual processors, software algorithms, or a combination of hardware processors, virtual processors, and/or software algorithms.

In one or more embodiments of the present invention, DNN 424 is trained to recognize policies for allowing a particular system and/or user to access a particular resource (e.g., hardware, data, software, etc.) using training data. Thereafter, when a system/user requests a particular resource, DNN 424 analyzes a descriptor of a hypergraph of policies/rules of resources for that user, in order to selectively direct that the requested resource be returned (or else not returned, depending on the output of DNN 424) to the requester.

With reference now the DNN 424 in FIG. 4, DNN 424 (analogous to machine learning system 124 shown in FIG. 1), is used to process a hypergraph descriptor 400 and a resource request 412 as described herein.

When hypergraph descriptor 400 (e.g., a hypergraph descriptor of the policy enforcement hypergraph 300 shown in FIG. 3) and a resource request 412 is input into a trained version of DNN 424, an identification of which resource, if any, that is authorized to be returned to the requester is identified in an output 402 from the DNN 424. In order to provide this functionality, DNN 424 must first be trained.

Thus, and in one or more embodiments of the present invention, DNN 424 is trained using by inputting a training hypergraph descriptor (a form of hypergraph descriptor 400) and a training resource request (a form of resource request 412) into DNN 424. The training hypergraph descriptor is selected according to features of the training resource request. That is, the training resource request contains information regarding what type of resource is being requested, a profile of the requester (e.g., hardware/software components of a requesting system, a location of the requesting system/user, rules associated with the requesting system/user, etc.), and is associated with a training hypergraph descriptor that describes the profile of the requested resource and the requester.

For example, assume that the training hypergraph descriptor describes a particular type of user (e.g., User A shown in FIG. 3), a particular type of resource (e.g., dataset D shown in FIG. 3), and a particular policy for using that particular type of resource (e.g., policy B shown in FIG. 3). Thus, the training resource request will describe a type of user that matches User A and a type of requested resource that matches dataset D. As such, policy B will determine whether or not an authorization to release a resource such as dataset D will be authorized to be released/sent to a type of user that matches User A. If policy B says "Yes", then DNN 424 is trained to show an output 402 that indicates that the requester is authorized to receive that type of resource. If policy B says "No", then DNN 424 is trained to show an output 402 that indicates that the requester is not authorized to receive that type of resource.

Thus, DNN 424 is trained to recognize a particular type of hypergraph descriptor and a particular type of resource request when determining whether or not to release a resource. While the high-level overview of training DNN 424 shown above describes just one training hypergraph descriptor and one type of training resource request, in a preferred embodiment of the present invention multiple training hypergraphs descriptors and their associated training resource requests are input into DNN 424 during training, such that DNN 424 is able to recognize many types of hypergraph descriptors and resource requests that are input to the trained DNN 424.

DNN 424 is an exemplary type of neural network used in one or more embodiments of the present. Other neural networks that can be used in one or more embodiments of the present invention include convolutional neural networks (CNNs) and neural networks that use other forms of deep learning.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a deep neural network (DNN), such as DNN 424, electronic neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

The electronic neurons (also referred to herein simply as "neurons" or "nodes") in DNN 424 are arranged in layers, known as an input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information.

As just mentioned, each node in the depicted DNN 424 represents an electronic neuron, such as the depicted neuron 409. As shown in block 411, each neuron (including neuron 409) functionally includes at least three features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the DNN 424 to be further "fine-tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the DNN 424, such that a reliable output will result from output layer 407. In one or more embodiments of the present invention, finding the values of weights and bias values is done automatically by training the neural network. In one or more embodiments of the present invention, manual adjustments are applied to tune hyperparameters such as learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted during the training of DNN 424, the weights are adjusted by the user, sensor logic, etc. in a repeated manner until the output from output layer 407 matches expectations. For example, assume that input layer 403 receives inputs that describe a particular type of hypergraph and a particular request. In an exemplary training input, the input to input layer 403 also contains values that describe policies for certain resources described in the training hypergraph, in order to train the DNN 424 to recognize whether a particular resource request 412 is authorized to receive the requested resource, based on the policies, vertices, hyperedges, etc. found in the hypergraph descriptor 400 that has been predetermined to be used when responding to a resource request 412 from a particular user/system and/or for a particular type of resource. If DNN 424 has been properly trained (by adjusting the mathematical function (s), output value(s), weight(s), and biases in one or more of the electronic neurons within DNN 424) to output a vector/value to the output layer 407, indicating that the neuron 404 that is associated with a particular hypergraph and type of requested resource, describes whether or not the requested resource is authorized to be returned to the requester, assuming that the input layer 403 and the hidden layers 405 have been properly trained.

When automatically adjusted, the weights (and/or mathematical function) are adjusted using "back propagation", in which weight values of the neurons are adjusted by using a "gradient descent" method that determines which direction each weight value should be adjusted to. This gradient descent process moves the weight in each neuron in a certain direction until the output from output layer 407 improves (e.g., accurately describes the requested resource should be returned to the requester).

As shown in FIG. 4, various layers of neurons are shaded differently, indicating that they are specifically trained for recognizing different aspects of a candidate resource and/or a policy that controls them.

Within the hidden layers 405 are layer 406, which contains neurons that are designed to evaluate a first set of features (e.g., descriptions of resources) found in the hypergraph; layer 408, which contains neurons that are designed to evaluate a second set of features (e.g., which policies are to be applied for the requested resource) to be applied to the resources evaluated in layer 406; and layer 410, which contains neurons that are designed to evaluate a third set of features (e.g., what types of requesters are authorized to receive their requested resources) for resources described in layer 408.

Thus, in the embodiment of DNN 464 shown in FIG. 4, layer 406 controls the inputs to the neurons in layer 408. The outputs of neurons from layer 408 then control the inputs to the neurons in layer 410.

While FIG. 4 depicts an embodiment of the present invention in which a DNN is used to establish an embedding for an unlabeled vertex in a hypergraph. Alternatively, unsupervised reinforced learning, such as Q-learning, can be utilized in one or more embodiments of the present invention.

Unsupervised reinforced learning is an artificial intelligence that uses train and error to eventually find an optimal approach to a task. For example, if the task is to hit a ball with a bat, a robot will randomly swing a bat at the pitched ball. If the bat swings above or below the pitched ball, or if the bat swings before or after the pitched ball passes by the bat, then a negative value (i.e., a negative reward) is given to the actions of the bat, thus encouraging the robot not to take such a swing. However, if the bat "tips" the pitched ball, then a positive reward/value is given to the robot for this swing, thus encouraging the robot to take such a swing. If the bat connects solidly with the pitched ball, then an even higher reward/value is given to the robot for taking this swing, thus encouraging the robot even further to take such a swing.

A Q-learning reinforced learning system uses a Q-learning algorithm, which updates Q values of rewards when the actor/robot performs a certain action (swinging a bat) in a certain state (when the pitched ball is approaching the robot).

Using these same approaches with the present invention, an unsupervised reinforced learning and/or a Q-learning reinforced learning system learns which traversal pathway through a hypergraph is best for determining if a particular user/system is authorized to access a particular resource.

Figure 5:
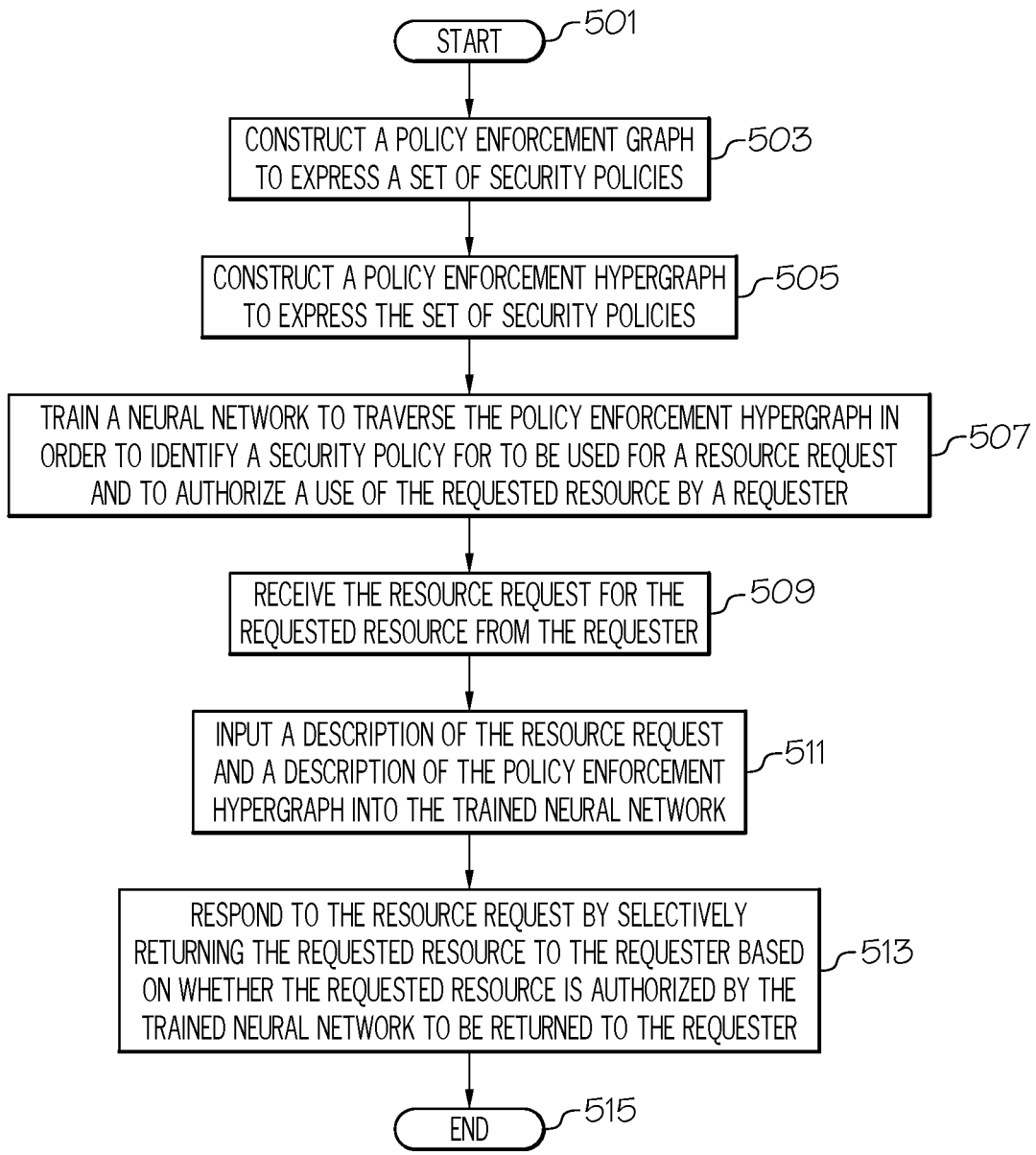
FIG. 5 is a high-level flow chart of one or more steps performed in accordance with one or more embodiments of the present invention.

With reference now to FIG. 5, a high-level flow chart of one or more procedures performed in one or more embodiments of the present invention is presented.

After initiator block 501, one or more processors construct a policy enforcement graph to express a set of security policies for resources and requesters, as shown in block 503. That is, a policy enforcement graph such as policy enforcement graph 200 shown in FIG. 2 contains detailed information regarding policies, resources, rules, and policy attributes about which requester and/or type of requester is authorized to access certain resources, such as datasets, software, hardware, etc., the nature and required level of security/protection required for certain resources, etc.

As shown in block 505, one or more processors construct a policy enforcement hypergraph (e.g., policy enforcement hypergraph 300 shown in FIG. 3) to express the set of security policies found in the policy enforcement graph (e.g., policy enforcement graph 200 shown in FIG. 2). As described above, the policy enforcement hypergraph is derived from the policy enforcement graph, and is a hypergraph is a generalization of a graph in which an edge can join any number of vertices.

As shown in block 507, one or more processors train a neural network to traverse the policy enforcement hypergraph in order to determine a security policy for the resource request and to authorize use of the requested resource by the requester. That is, a neural network (such as DNN 424 shown in FIG. 4) is trained by training hypergraphic descriptors and training resource requests to recognize a policy/rule that applies to a requester of a resource. Once trained, the trained neural network is able to determine whether or not a requester for a particular resource should have the requested resource sent to that requester.

As shown in block 509, one or more processors receive a resource request for a requested resource from a requester, where the resource request includes a description of the requester. That is, the resource request 412 shown in FIG. 4 not only describes what resource is being requested, but also describes the requester, whether it be a hardware system, a computer program, a person, etc.

As shown in block 511, a description of the received resource request (e.g., resource request 412 shown in FIG. 4) and a description of the policy enforcement hypergraph (e.g., hypergraph descriptor 400 shown in FIG. 4) is input into the trained neural network, causing it to output a decision (output 402 shown in FIG. 4) as to whether or not the requester is approved to receive the requested resource.

As shown in block 513, a response is made to the resource request by selectively returning (or else not returning) the requested resource to the requester based on whether the requested resource is deemed to be authorized for use by the requester by the trained neural network, and thus is returned to the requester.

That is, once the requested resource is authorized for use by and/or to be sent to the requester, the requested resource is made available to, sent to, etc. the requesting user.

For example, assume that, in one or more embodiments of the present invention, the requested resource is data, such as data from dataset D shown in FIG. 3. As such, if authorized for use by the requester, then data from the dataset D is sent to the user, a computer used by the user, a storage device used by the user, etc.

In one or more embodiments of the present invention, the requested resource is a device, such as a storage device, a data server, a computer, etc. As such, if authorized for use by the requester, then access to the device is made available to the requester by sending the requester a password for accessing the device. Alternatively, the device is physically shipped to the user.

In one or more embodiments of the present invention, the requested resource is a network-based service, such as an inventory service, a billing service, a customer interface service, etc. As such, if authorized for use by the requester, then access to the network-based service is made available to the requester by sending the requester a password for accessing the network-based service.

The flow chart ends at terminator block 515.

In an embodiment of the present invention, the policy enforcement hypergraph is constructed such that security policies are expressed as context vertices and events are expressed as hyperedges. For example, consider policy enforcement hypergraph 300 shown in FIG. 3. In this embodiment, context vertices such as rule 31 describe a context in which access to a resource such as dataset D is authorized for use by User A. A hyperedge (e.g., hyperedge I) describes an event, such as the request from User A to access dataset D, which hyperedge II describes the event of a request from User A to access dataset E. Thus, the DNN 424 shown in FIG. 4 will selectively walk through either hyperedge I or hyperedge II based on which resource (dataset D or dataset E) is described in the resource request 412, thus saving resources used by the processing system that walks through the hypergraph, thus improving that processing system by making it faster and more efficient.

As shown in the policy enforcement hypergraph 300 shown in FIG. 3, one or more embodiments of the present invention utilize a policy enforcement hypergraph that is made up of a plurality of knowledge graphs, such as hyperedge I, hyperedge II, and hyperedge III. Thus, a single policy enforcement hypergraph is able to handle multiple different types of requests from different types of users for different types of resources. In one or more embodiments of the present invention, security rules (e.g., rules 31-36 in FIG. 3) from policies (e.g., policies B and C) are expressed as vertices in the policy enforcement hypergraph that comprises the plurality of knowledge graphs.

In an embodiment of the present invention, vertices in the policy enforcement hypergraph represent data assets (e.g., dataset D shown in FIG. 3) and users of the data assets (e.g., the requesting User A), and supravertices (e.g., policy B and policy C) in the policy enforcement hypergraph represent policies for use of the data assets. That is, policy B and policy C overlay multiple hyperedges and the data assets and users that they represent, such that policy B and policy C are supravertices in the policy enforcement hypergraph. As such, the DNN 424 is able to just walk through a particular policy that overlays hyperedges that include the user and dataset identified in the resource request 412 shown in FIG. 4. As shown in FIG. 4, exemplary policy B also contains subvertices (e.g., rules 31-33) within the vertex that is policy B.

Thus, the present invention describes a novel approach for managing access to resources through the user of a representation of policy, data, and user interactions/relationships as a hypergraph, and traversing through the hypergraph to determine policy enforcement applicable to accessing a particular resource. As described herein, in one or more embodiments of the present invention vertices in the hypergraph include data policies (with rules), data assets, and users; hyperedges include requests, ownership, application to, decision response, and similarity for requested resources; and paths represent events (the lifecycle of a data asset request) that are traversed in order to determine whether to authorize access to a resource.

The features enable a neural network to traverse along paths to note the relationships between datasets, similarities, etc. since hyperedges represent temporal events or contexts, and paths for traversal are clearly defined (rather than using a policy enforcement graph 200 that has paths and contexts that have to be labeled on edges with unique identifiers). This novel use of a hypergraph enables the system to enforce policies based on path traversal that takes into account relationships between users, assets, and policies, among themselves and each other, in order to use efficient graph algorithms to carry such path traversals in real-time.

As such, one or more embodiments of the present invention begin by creating a linear policy enforcement graph (e.g., policy enforcement graph 200 shown in FIG. 2) by adding vertices that describe assets/resources users, policies (with rules as subvertices), and edges that describe correlations, contexts, or events to these vertices. The invention then adds hyperedges as correlations, contexts, or events to these vertices to construct a policy enforcement hypergraph (e.g., policy enforcement hypergraph 300 shown in FIG. 3) by defining the relations that vertex types have between each other.

Once the policy enforcement hypergraph is constructed, it can be traversed by defining algorithms for traversal-based policy enforcement (e.g., taking a particular path/hyperedge based on the identity of the requester and the identity of the requested resource), where hyperedges denote similarities between assets, association of policies to assets or users, and provenance. Relationships between vertices give insight to level of potential vulnerability, and paths give an end decision response to the requester that submitted the resource request.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
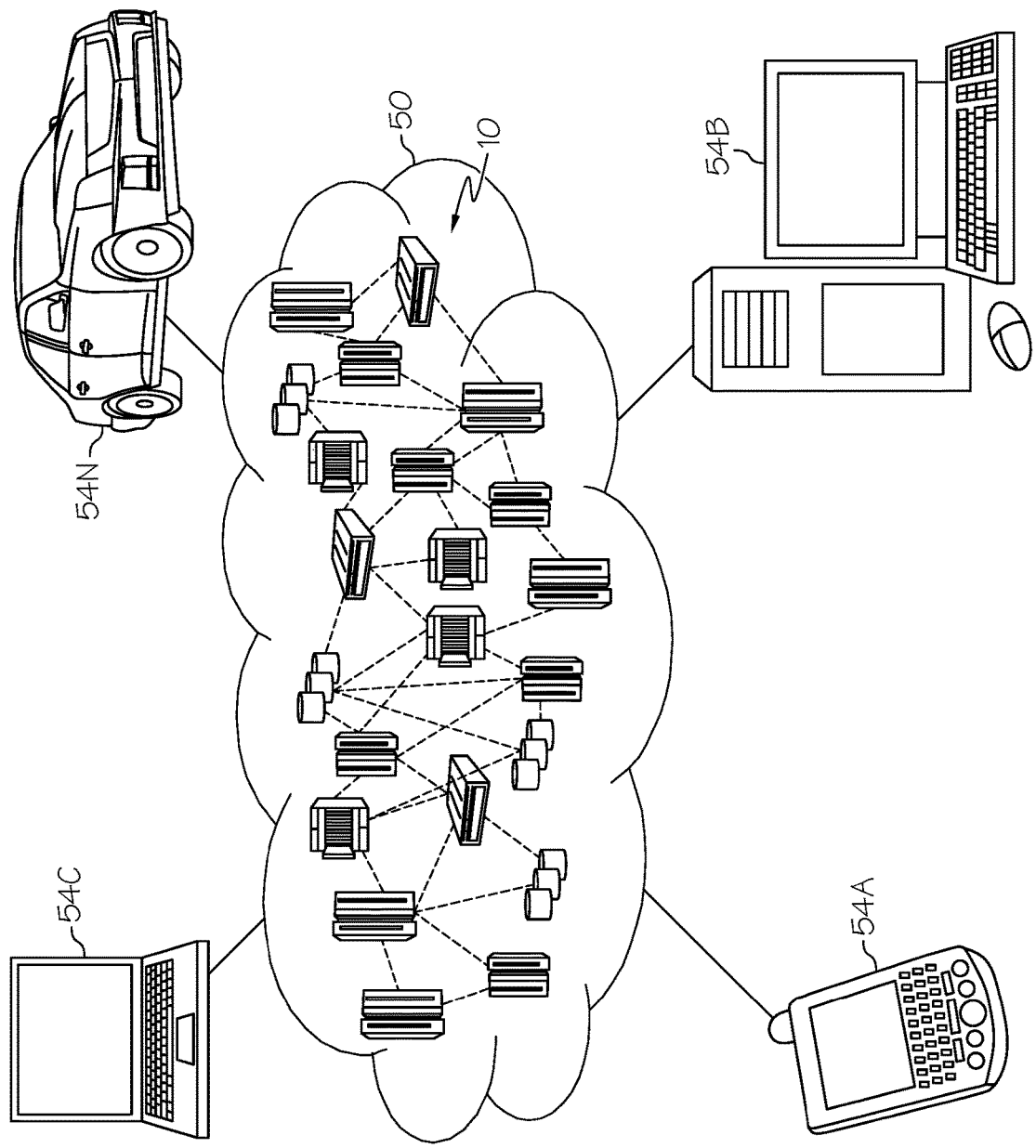
FIG. 6 depicts a cloud computing environment according to one or more embodiments of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one or more embodiments, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
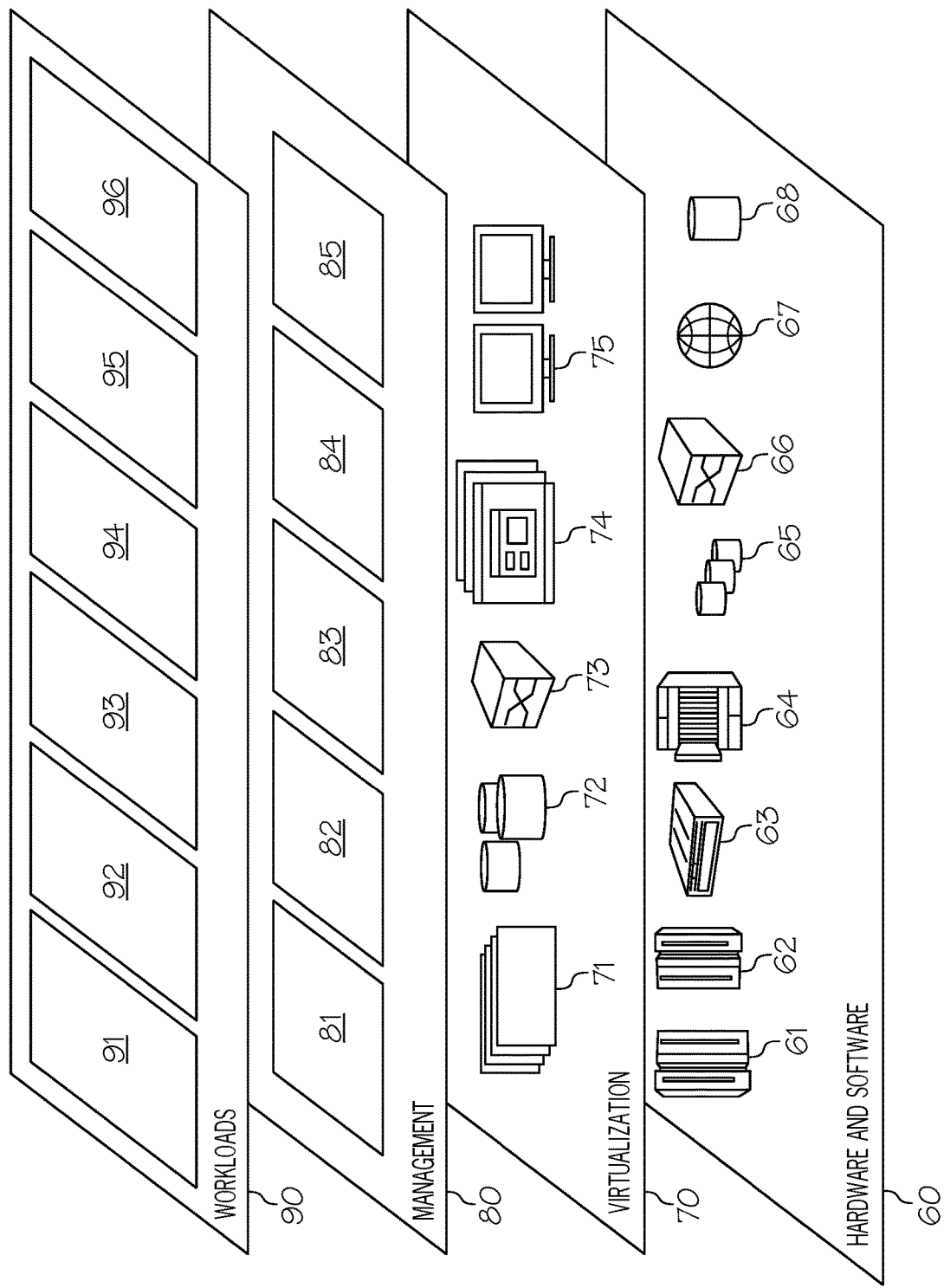
FIG. 7 depicts abstraction model layers of a cloud computer environment according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and hypergraph processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    training, by one or more processors, a neural network to traverse a policy enforcement hypergraph in order to identify a security policy to be used for a resource request and to authorize a use of a requested resource by a requester, wherein the policy enforcement hypergraph is derived from a policy enforcement graph that expresses a set of security profiles, and wherein the policy enforcement hypergraph is a generalization of a graph in which an edge can join any number of vertices;
    receiving, by one or more processors, the resource request for the requested resource from the requester, wherein the resource request includes a description of the requester;
    inputting a description of the received resource request and a description of the policy enforcement hypergraph into the trained neural network; and
    responding to the resource request by selectively returning the requested resource to the requester based on whether the requested resource is authorized by the trained neural network to be returned to the requester.

2. The method of claim 1, further comprising:
    constructing, by one or more processors, the policy enforcement graph; and
    constructing, by one or more processors, the policy enforcement hypergraph.

3. The method of claim 1, wherein the requested resource is data.

4. The method of claim 1, wherein the requested resource is a device.

5. The method of claim 1, wherein the requested resource is a network-based service.

6. The method of claim 1, wherein the policy enforcement hypergraph is constructed such that security policies are expressed as context vertices and events are expressed as hyperedges.

7. The method of claim 1, wherein the policy enforcement hypergraph comprises a plurality of knowledge graphs.

8. The method of claim 7, wherein rules from security policies are expressed as vertices in the policy enforcement hypergraph that comprises the plurality of knowledge graphs.

9. The method of claim 1, wherein vertices in the policy enforcement hypergraph represent data assets and users of the data assets, and wherein subvertices in the policy enforcement hypergraph represent policies for use of the data assets.

10. A computer program product comprising a computer readable storage medium having program code embodied therewith, wherein the computer readable storage medium is not a transitory signal per se, and wherein the program code is readable and executable by a processor to perform a method comprising:
    training a neural network to traverse a policy enforcement hypergraph in order to identify a security policy to be used for a resource request and to authorize a use of a requested resource by a requester, wherein the policy enforcement hypergraph is derived from a policy enforcement graph that expresses a set of security profiles, and wherein the policy enforcement hypergraph is a generalization of a graph in which an edge can join any number of vertices;
    receiving the resource request for the requested resource from the requester, wherein the resource request includes a description of the requester;

inputting a description of the received resource request and a description of the policy enforcement hypergraph into the trained neural network; and responding to the resource request by selectively returning the requested resource to the requester based on whether the requested resource is authorized by the trained neural network to be returned to the requester.

11. The computer program product of claim 10, wherein the requested resource is a network-based service.

12. The computer program product of claim 10, wherein the policy enforcement hypergraph is constructed such that rules from security policies are expressed as context vertices and events are expressed as hyperedges.

13. The computer program product of claim 10, wherein the policy enforcement hypergraph comprises a plurality of knowledge graphs.

14. The computer program product of claim 10, wherein vertices in the policy enforcement hypergraph represent data assets and users of the data assets, and wherein subvertices in the policy enforcement hypergraph represent policies for use of the data assets.

15. The computer program product of claim 10, wherein the program code is provided as a service in a cloud environment.

16. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

training a neural network to traverse a policy enforcement hypergraph in order to identify a security policy to be used for a resource request and to authorize a use of a requested resource by a requester, wherein the policy enforcement hypergraph is derived from a policy enforcement graph that expresses a set of security profiles, and wherein the policy enforcement hypergraph is a generalization of a graph in which an edge can join any number of vertices;

receiving the resource request for the requested resource from the requester, wherein the resource request includes a description of the requester;

inputting a description of the received resource request and a description of the policy enforcement hypergraph into the trained neural network; and responding to the resource request by selectively returning the requested resource to the requester based on whether the requested resource is authorized by the trained neural network to be returned to the requester.

17. The computer system of claim 16, wherein the policy enforcement hypergraph is constructed such that rules from security policies are expressed as context vertices and events are expressed as hyperedges.

18. The computer system of claim 16, wherein the policy enforcement hypergraph comprises a plurality of knowledge graphs.

19. The computer system of claim 16, wherein vertices in the policy enforcement hypergraph represent data assets and users of the data assets, and wherein subvertices in the policy enforcement hypergraph represent policies for use of the data assets.

20. The computer system of claim 16, wherein the program code is provided as a service in a cloud environment.

* * * * *